US012314116B2

(12) United States Patent
Samson et al.

(10) Patent No.: US 12,314,116 B2
(45) Date of Patent: May 27, 2025

(54) SYSTEMS AND METHODS FOR ADAPTIVE POWER MULTIPLEXING

(71) Applicant: QUALCOMM Incorporated, San Diego, CA (US)

(72) Inventors: Giby Samson, San Diego, CA (US); Smeeta Heggond, Bagalkot (IN); Jitu Khushalbhai Mistry, San Diego, CA (US); Paras Gupta, San Diego, CA (US); Keyurkumar Karsanbhai Kansagra, Bangalore (IN); Kamesh Medisetti, Bangalore (IN); Ramaprasath Vilangudipitchai, San Diego, CA (US); Arshath Sheeparamatti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 18/000,319

(22) PCT Filed: Jul. 28, 2021

(86) PCT No.: PCT/US2021/043351
§ 371 (c)(1),
(2) Date: Nov. 30, 2022

(87) PCT Pub. No.: WO2022/026489
PCT Pub. Date: Feb. 3, 2022

(65) Prior Publication Data
US 2023/0221789 A1    Jul. 13, 2023

(30) Foreign Application Priority Data

Jul. 31, 2020   (IN) .............................. 202041032888

(51) Int. Cl.
G06F 1/26        (2006.01)
G06F 1/3234      (2019.01)
G06F 1/3296      (2019.01)

(52) U.S. Cl.
CPC ............ *G06F 1/3296* (2013.01); *G06F 1/263* (2013.01); *G06F 1/3275* (2013.01)

(58) Field of Classification Search
None
See application file for complete search history.

(56) References Cited

U.S. PATENT DOCUMENTS 6,894,472 B2   5/2005   Chen
7,005,911 B1   2/2006   Om'mani
(Continued)

FOREIGN PATENT DOCUMENTS

CN       101452746 A    6/2009
JP       2008067369 A   3/2008
(Continued)

OTHER PUBLICATIONS

International Search Report and Written Opinion—PCT/US2021/043351—ISA/EPO—Nov. 11, 2021.
Taiwan Search Report—TW110127887—TIPO—Dec. 25, 2024.

*Primary Examiner* — Fahmida Rahman
(74) *Attorney, Agent, or Firm* — Haynes and Boone, LLP/Qualcomm

(57) ABSTRACT

A system on chip (SOC) comprising: first memory block and a second memory block; a processing unit coupled to the first memory block and the second memory block; a first power multiplexor disposed between the first memory block and the second memory block and coupled to a first power rail configured to provide an operating voltage to both the first memory block and the second memory block; and enable logic circuitry disposed at a periphery of the SOC (Continued)

away from the first memory block and the second memory block, the enable logic being coupled to control terminals of the first power multiplexor.

16 Claims, 12 Drawing Sheets

(56) References Cited

U.S. PATENT DOCUMENTS

| | | |
|---|---|---|
| 9,450,580 B2 | 9/2016 | Lundberg et al. |
| 9,977,480 B2 | 5/2018 | Kolla et al. |
| 10,103,626 B1 | 10/2018 | Narayanan et al. |
| 2002/0097237 A1 | 7/2002 | Tomio et al. |
| 2005/0146230 A1 | 7/2005 | Tsai et al. |
| 2008/0048500 A1 | 2/2008 | Kihara et al. |
| 2009/0146499 A1 | 6/2009 | Takeda et al. |
| 2012/0081975 A1* | 4/2012 | Yamaki ............... G11C 5/147 365/189.07 |
| 2013/0128648 A1 | 5/2013 | Holt et al. |
| 2016/0070323 A1 | 3/2016 | Patil et al. |
| 2016/0109932 A1* | 4/2016 | Jeon ................. G06F 1/3296 713/323 |
| 2016/0322097 A1 | 11/2016 | Shin et al. |
| 2017/0033796 A1 | 2/2017 | Cao et al. |
| 2017/0060224 A1 | 3/2017 | Cao et al. |
| 2017/0126005 A1 | 5/2017 | Elsayed et al. |
| 2018/0284859 A1* | 10/2018 | Pant ................. G06F 1/3243 |
| 2019/0138079 A1 | 5/2019 | Arimilli et al. |
| 2021/0056045 A1* | 2/2021 | Venkata ......... G11C 11/40603 |

FOREIGN PATENT DOCUMENTS

| | | |
|---|---|---|
| JP | 2013004998 A | 1/2013 |
| TW | 201931367 A | 8/2019 |
| WO | 2009069092 A2 | 6/2009 |
| WO | 2016168238 | 10/2016 |

* cited by examiner

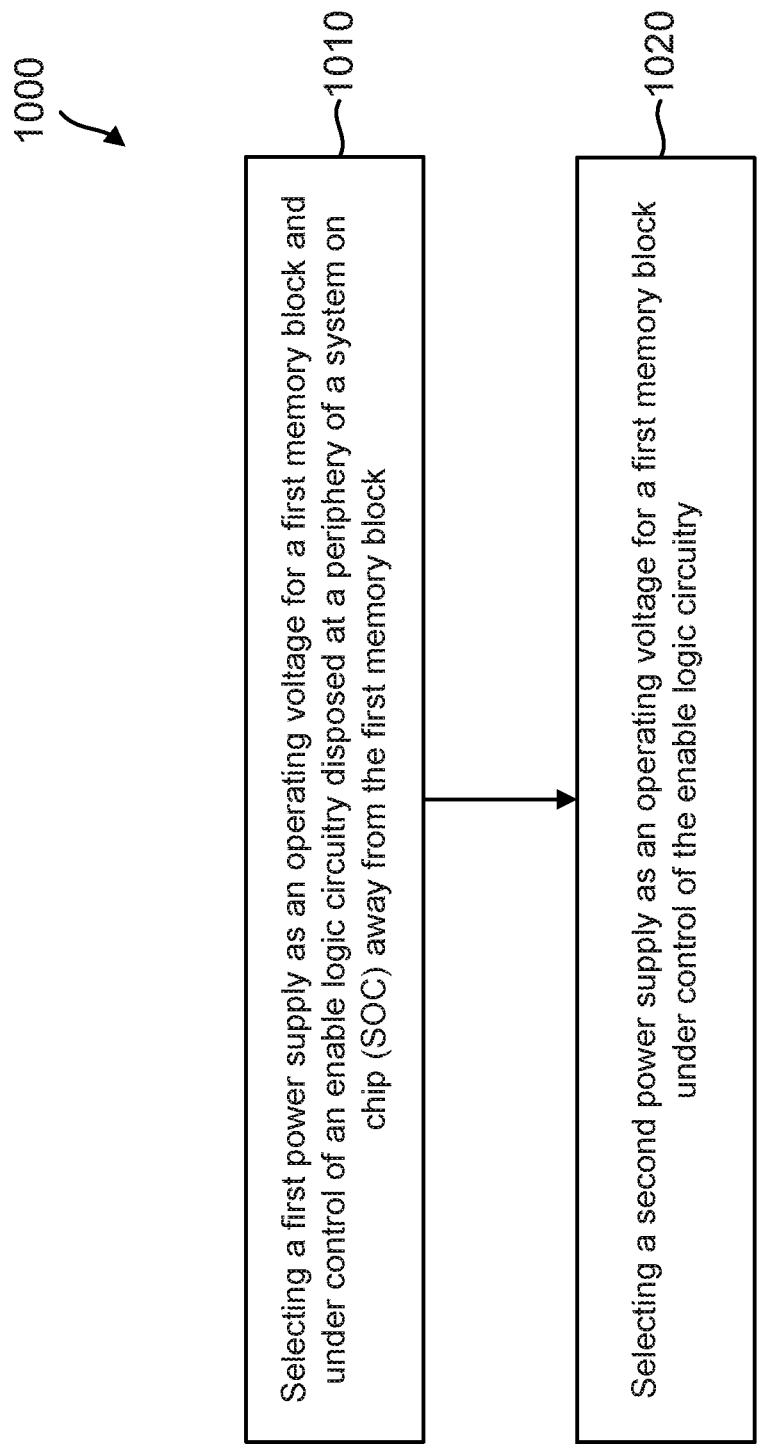

SYSTEMS AND METHODS FOR ADAPTIVE POWER MULTIPLEXING

CROSS-REFERENCE TO RELATED APPLICATIONS

The present application is a 35 U.S.C. 371 National Phase entry of Patent Cooperation Treaty (PCT) Application No. PCT/US2021/043351, filed Jul. 28, 2021, which claims priority to and the benefit of Indian Provisional Patent Application No. 202041032888, filed Jul. 31, 2020, both of which are hereby incorporated by reference in their entireties as if fully set forth below and for all applicable purposes.

TECHNICAL FIELD

The present application relates, generally, to power multiplexing and, more specifically, to reducing power use in power delivery networks that employ power multiplexing.

BACKGROUND

A conventional computing device (e.g., smart phone, tablet computer, etc.) may include a system on chip (SOC), which has a processor and other operational circuits. The SOC may receive its power from a battery, and thus conventional designs may balance SOC performance and power usage to deliver a desirable experience to the user while requiring as little battery charging as practicable.

Power multiplexing is a technique that may be used to save power in some instances. One way in which some systems may use power multiplexing to save power is to enable a power collapse of some parts of a processing core (using a first power multiplexor and a first power domain) while providing power to other parts of the processing core (using a second power multiplexor and a second power domain). Another way in which some conventional systems may use power multiplexing is to switch from a first power supply to a second power supply to power a central processing unit (CPU) memory and adjusting the second power supply to overdrive the CPU memory. This technique may save power by allowing the SOC to selectively raise a voltage at some components while not raising the voltage at other components.

Some power multiplexing architectures may include placing power multiplexors and their enable circuitry along a periphery of a SOC. The power multiplexors couple to memory blocks toward the interior of the SOC. In one example, a power multiplexor at a periphery of the SOC may provide power to multiple memory blocks by a power rail that traverses from one memory block to the next memory block in series. Memory blocks in series furthest from the power multiplexor experience a voltage drop that increases quadratically based on the number of intervening memory blocks. In other words, the voltage drop may become unacceptable after only traversing a few memory blocks. There is a need in the art for a more efficient power distribution network (PDN) that experiences less voltage drop.

SUMMARY

Various implementations provide circuits and techniques to reduce voltage drop in power distribution networks (PDNs). In one example, power multiplexors are placed proximate memory blocks. For instance, power multiplexors may be placed within memory channels, among other locations. As a result, the power multiplexors may provide power to their respective memory blocks in a way that reduces or avoids the quadratic power drop due to intervening memory blocks in series.

According to one implementation, a system on chip (SOC) includes: a first memory block and a second memory block; a processing unit coupled to the first memory block and the second memory block; a first power multiplexor disposed between the first memory block and the second memory block and coupled to a first power rail configured to provide an operating voltage to both the first memory block and the second memory block; and enable logic circuitry disposed at a periphery of the SOC away from the first memory block and the second memory block, the enable logic circuitry being coupled to control terminals of the first power multiplexor.

According to one implementation, a method including: selecting a first power supply as an operating voltage for a first memory block, wherein the first power supply is selected by a first power multiplexor disposed between the first memory block and a second memory block, wherein the selecting is under control of an enable logic circuitry disposed at a periphery of a system on chip (SOC) away from the first memory block and the second memory block; and selecting a second power supply as an operating voltage for the first memory block under control of the enable logic circuitry.

According to one implementation, a semiconductor chip including: a first memory block and a second memory block; means for selecting between a first power supply and a second power supply, wherein the selecting means are disposed between the first memory block and the second memory block and configured to provide an operating voltage to the first memory block; and means for controlling the selecting means, wherein the controlling means are disposed at a periphery of the chip away from the first memory block and the second memory block, the controlling means being coupled to control terminals of transistors of the selecting means.

According to yet another implementation, a system on chip (SOC) including: a first memory block and a second memory block; processing logic comprising a grouping of standard cells, the processing logic being disposed so that the first memory block and the second memory block are between the processing logic and a periphery of the SOC, the periphery of the SOC corresponding to a lateral portion of a side of the SOC; enable logic circuitry disposed within the periphery of the SOC; a first plurality of power multiplexors disposed between the first memory block and the second memory block, the first plurality of power multiplexors configured to receive enable signals and a switching voltage from the enable logic circuitry, and a second plurality of power multiplexors disposed between the second memory block and the processing logic, the second plurality of power multiplexors configured to receive the enable signals and the switching voltage from the enable logic circuitry.

BRIEF DESCRIPTION OF THE DRAWINGS

FIG. 10 is an illustration of an example method, adapted according to one implementation.

DETAILED DESCRIPTION

Figure 1:
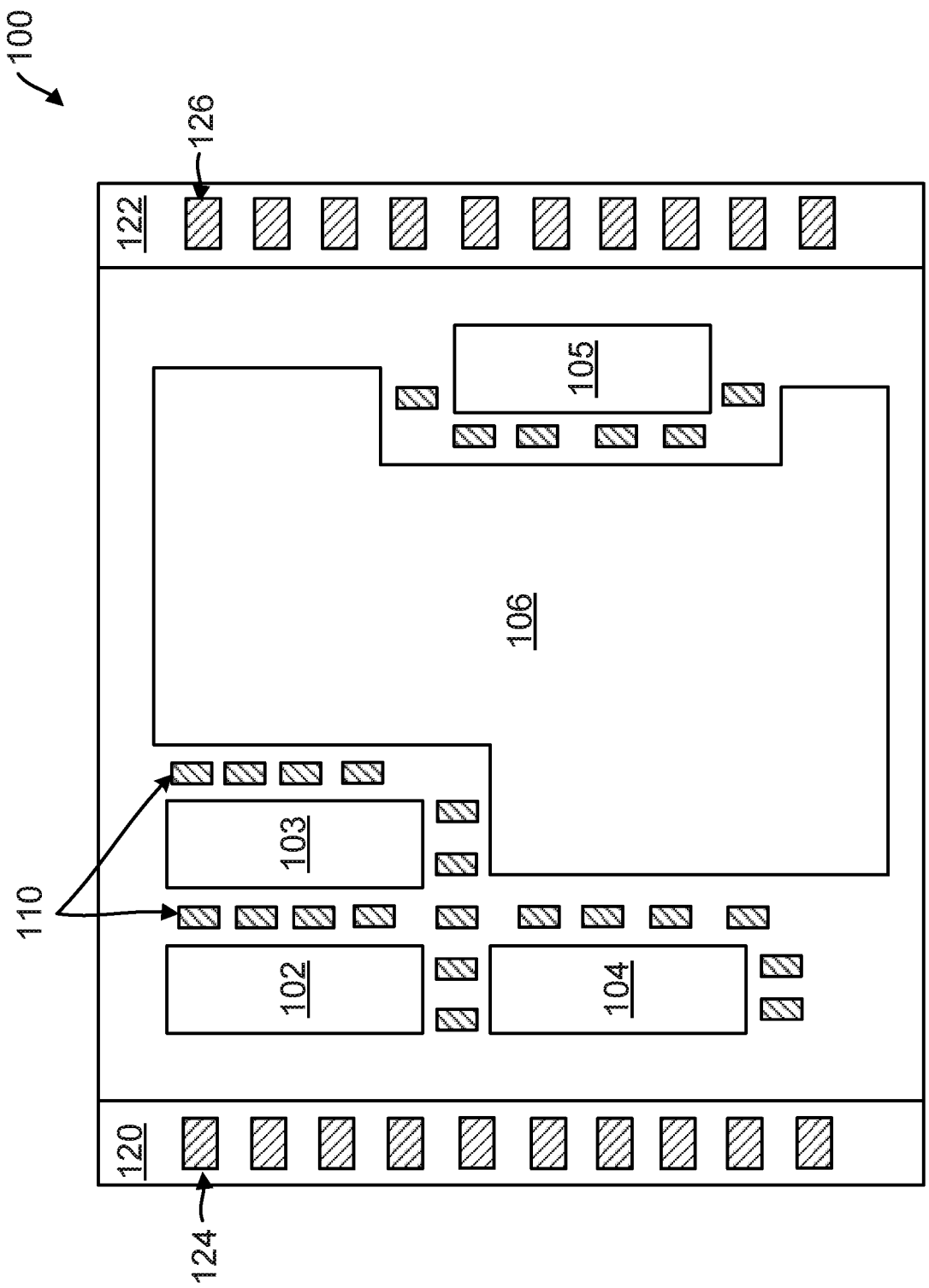
FIG. 1 is a simplified diagram illustrating an example SOC, including an improved power distribution network (PDN) having power multiplexors placed proximate memory blocks.

Various implementations provided herein include systems and methods to provide power multiplexing to memory blocks with less voltage drop than in other designs. Multiplexing circuitry may be placed nearer memory blocks, such as in memory channels (spaces between two memory blocks) or otherwise proximate any side of a memory block, thereby reducing a number of memory blocks powered in series. The reduction in the number of memory blocks that are powered in series may reduce a voltage drop from the power multiplexing circuitry to the memory block that is powered by the power multiplexing circuitry.

Continuing with the example, the system may include a system on chip (SOC), having first memory block and a second memory block. Examples of memory blocks include level 2 cache within a processor, though any acceptable memory block of random access memory (RAM) or read only memory (ROM) may be used in some implementations. The SOC may also include a processing unit, such as a central processing unit (CPU), a graphics processing unit (GPU), or other standard cells or intellectual property (IP) cores.

The SOC further includes a first power multiplexor that is disposed between the first memory block and the second memory block. The first power multiplexor is coupled to a first power rail that provides an operating voltage to both the first memory block and the second memory block. The SOC also includes enable logic circuitry disposed at its periphery, away from the first and second memory blocks. The periphery of the SOC in this example includes a space around the physical perimeter of the SOC outside of processing circuitry and memory blocks and may include a lateral portion of one or more sides of the SOC. The enable logic in this example is coupled to control terminals of the first power multiplexor to control the power multiplexor to select either a first power supply or a second power supply. In other words, the operating voltage is selected from among the first power supply and the second power supply according to the enable logic circuitry.

In one example, the SOC also includes a second power multiplexor that is disposed between the first memory block and the processing unit and is also coupled to the first power rail. In this example, the first power multiplexor and the second power multiplexor are both coupled to the first memory block to supply power to the first memory block. In some examples, the first power multiplexor may be one of a plurality of power multiplexors disposed in a memory channel between the first memory block and the second memory block.

Such example implementations may place the first power multiplexor adjacent the first memory block and the second memory block, thereby allowing the first power multiplexor to supply power to either or both of the first memory block and the second memory block without either of those memory blocks experiencing a voltage drop due to another memory block. Put another way, some implementations may include an electrical connection from the first power multiplexor to either or both of the first and second memory blocks without other intervening memory blocks causing a voltage drop before the voltage is delivered to either or both of the first and second memory blocks.

In one example, the placement of the first power multiplexor is made possible by reducing a size of the first power multiplexor. The first power multiplexor may be reduced in size by including only multiplexing circuitry within the first power multiplexor and placing enable logic and other supporting circuitry somewhere else (e.g., at the periphery of the SOC). For instance, the SOC may further include a voltage generator that provides a switching voltage operable to turn off transistors within the multiplexor. The voltage generator may be disposed in the periphery of the SOC or in another appropriate place, such as adjacent the first memory block. However, the voltage generator in this instance is not disposed within a block of the first power multiplexor. Thus, the block of the first power multiplexor may be small enough to place within a memory channel or between the memory block and the processing unit.

Thus, various implementations may include more space-efficient power multiplexors that may be placed in smaller areas, such as in memory channels and the like. The enable logic circuitry and the voltage generators may be placed elsewhere outside of the multiplexers themselves.

Various implementations may also include methods. An example method includes selecting a first power supply by controlling a power multiplexor. The power multiplexor may include one such as described in the examples herein, which may have a reduced size and be placed in a memory channel or between a memory block and the processing unit. The selecting is performed by either asserting or de-asserting a signal from enable logic circuitry that is placed away from the power multiplexor. For instance, the enable logic circuitry may be placed at a periphery of the SOC and be separated from the power multiplexor by a memory block, multiple memory blocks, a processing unit, or the like. The method may further include selecting a second power supply by controlling the power multiplexor by either asserting or de-asserting the signal.

Various implementations may include advantages over other systems. One advantage includes reducing a voltage drop on a power rail that supplies the memory block. Such advantage may be achieved by placing power multiplexing circuitry proximate the memory block to avoid intervening voltage drops between the power multiplexing circuitry and the memory block. As a result, a minimum power rail voltage may be lowered, while still allowing for a desired voltage level because intervening voltage drops do not have to be compensated. Therefore, power use may be reduced, and battery life may be lengthened in some handheld devices.

FIG. 1 is a simplified diagram illustrating an example SOC 100, including an improved power distribution network (PDN) having power multiplexors placed proximate memory blocks. The example SOC 100 includes a semiconductor chip having processing blocks 106. The processing blocks 106 may include multiple processing devices, such as a graphics processing unit (GPU), a central processing unit (CPU), a modem unit, a camera unit, and the like. In some examples, the SOC may be included within a chip package, mounted on a printed circuit board, and disposed within a portable device, such as a smart phone or tablet computer. However, the scope of implementations is not limited to a chip implemented within a tablet computer or smart phone, as other applications are possible.

The processing blocks 106 may include a CPU having multiple cores, and one or more of those cores may execute computer-readable code providing the functionality of an operating system kernel. Such CPU cores may read and write data to the memory blocks 102-105. Furthermore, the example operating system kernel may include power management software that may control power use within the SOC 100. For instance, the power management software may determine to put one or more CPU cores into a turbo mode and to raise a voltage at one or more of the memory blocks 102-105 to support the CPU turbo mode. Similarly, the power management software may determine to put one or more CPU cores into a lower operation mode, consistent with power savings, during normal operation. In such case, the power management software may lower a voltage at one or more of the memory blocks 102-105. Further in this example, either raising or lowering an operating voltage at the memory blocks 102-105 may include controlling a power multiplexor 110 to choose either a higher power supply or a lower power supply, consistent with an operating mode.

Power multiplexors 110 are shown distributed away from the peripheries 120, 122 of SOC 100 and, instead, proximate the memory blocks 102-105. For instance, some power multiplexors 110 are placed in a memory channel between memory blocks 102 and 103, and other power multiplexors are placed in a memory channel between memory blocks 102 and 104. In fact, memory blocks 103, 104, and 105 each have power multiplexors arranged around three sides.

Memory blocks 110 are placed between memory block 103 and processing blocks 106. Memory blocks 110 are also placed between memory block 104 and processing blocks 106 and between memory block 105 and processing blocks 106. Each of the power multiplexors 110 serves a respective memory block 102-105 by providing an operating voltage to that memory block and without an intervening voltage drop from another memory block. For instance, power multiplexor 110a may provide an operating voltage to memory block 103 without the voltage drop attributable to any other of the memory blocks 102, 104, 105. The same is true of each of the other power multiplexors 110 serving their respective memory blocks 102-105. Nevertheless, the scope of implementations does not prohibit that some memory blocks may be served in any appropriate way by other power multiplexors (not shown).

The SOC 100 also includes the enable logic circuitry blocks, examples of which are shown as items 124 and 126. The enable logic circuitry blocks are located in the peripheries 120, 122 of the SOC 100. The enable logic circuitry blocks are responsible for controlling the power multiplexors 110 via enable signals and for supplying a switching voltage in some example implementations. The enable signal and switching voltage are described in more detail below.

The particular architecture shown in FIG. 1 is one example, and the scope of implementations is not so limited. For instance, various implementations may include any appropriate number or placement of power multiplexors 110, any number or placement of memory blocks, any number or placement of enable logic circuitry, and any number and placement of processing blocks 106.

Figure 2:
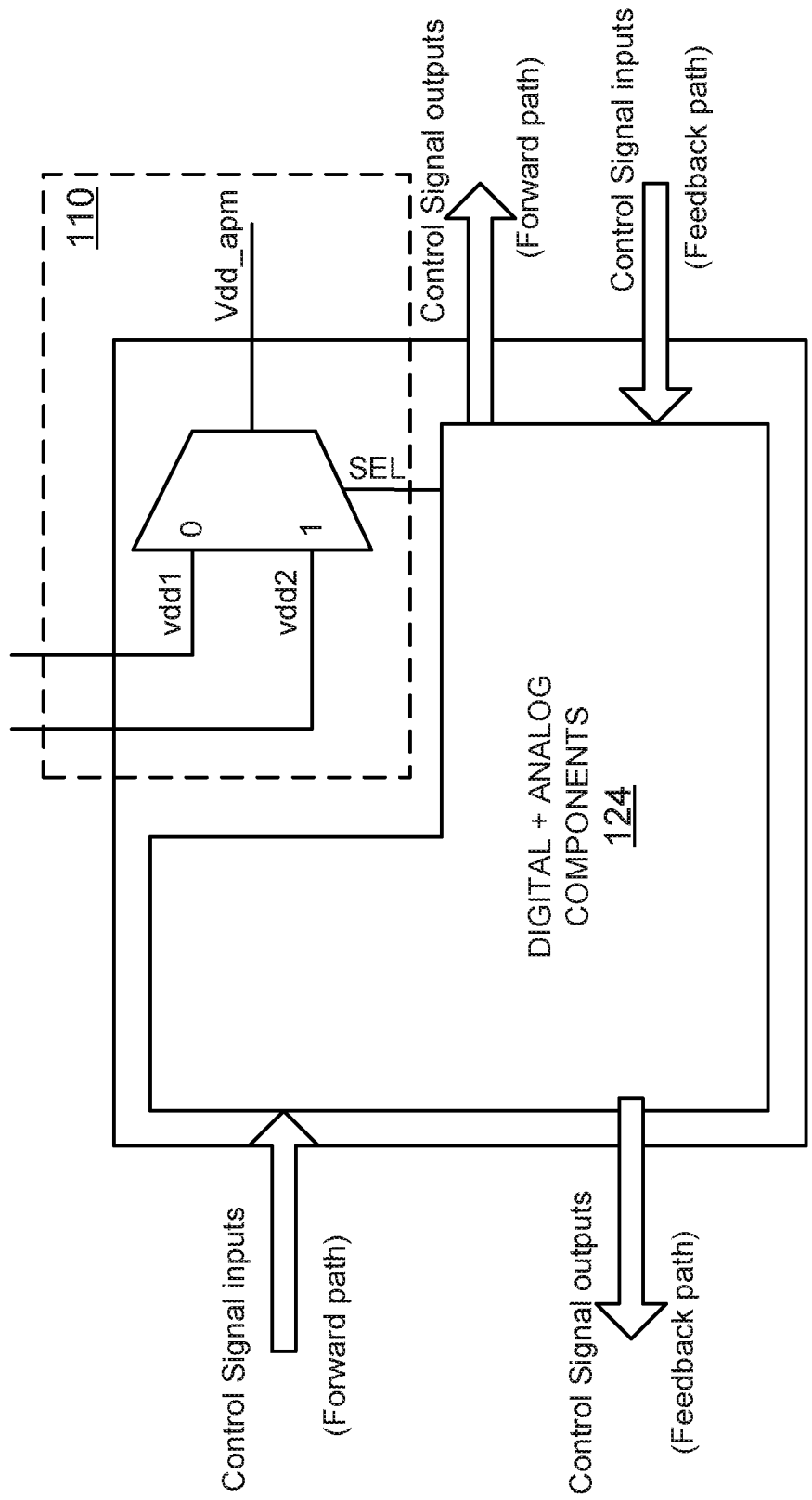
FIG. 2 is an illustration of example multiplexing circuitry, according to one implementation.

FIG. 2 is a conceptual diagram of one example of multiplexing circuitry, according to one implementation. FIG. 2 is provided to show that the power multiplexor 110 and enable logic circuitry block 124 can be placed physically in a same block. By contrast, the implementation of FIG. 1 physically separates the power multiplexor 110 from the enable logic circuitry block 124, thereby providing a smaller silicon footprint for the multiplexor 110 itself separate from any silicon footprint attributable to the enable logic circuitry block 124.

The enable logic circuitry block 124 includes a forward path, which may communicate with power management software, such as within an operating system kernel running on a processor core of the SOC 100. The forward path may include signals from the power management software that instruct the enable logic circuitry block 124 to select one or the other power supplies Vdd 1, Vdd 2. A select signal "SEL" is provided from the enable logic circuitry block 124 to the multiplexor 110, where assertion or de-assertion selects one of the other of the power supplies Vdd 1, Vdd 2. Although not discussed further herein, the enable logic circuitry block 124 may have further control signal outputs to other components (not shown) and may receive control signal inputs on a feedback path from those or other components (not shown). Furthermore, the enable logic circuitry block 124 may also provide control signal feedback to the power management software.

The output of the power multiplexor 110 (Vdd_apm) is provided to a memory block, such as any one of memory blocks 102-105 of FIG. 1. The enable logic circuitry block 124 is shown as an example, and it is understood that the concepts described with respect to block 124 apply as well to block 126 and the other enable logic circuitry blocks within peripheries 120, 122 of SOC 100.

Figure 3A:
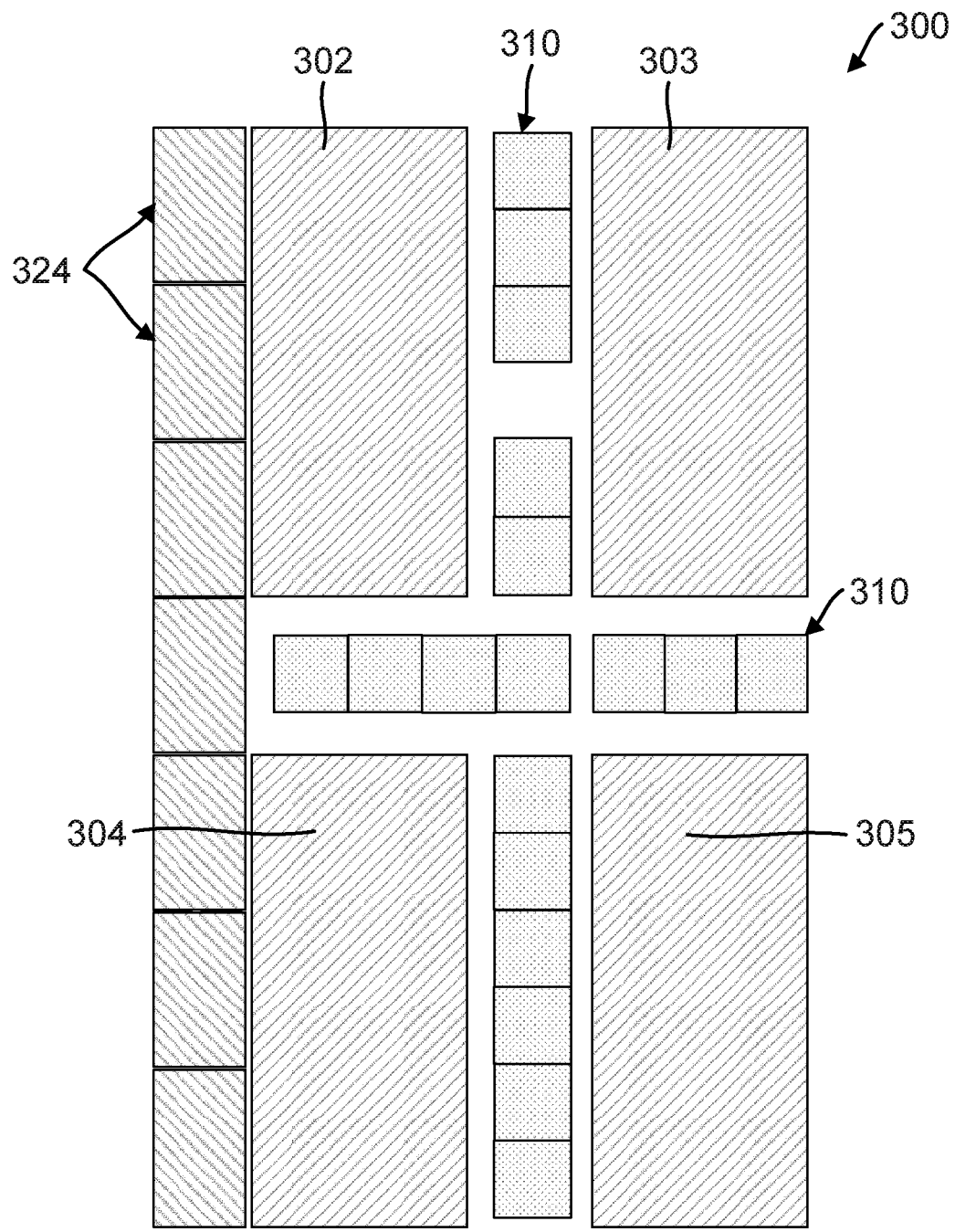
FIGS. 3A-C illustrate an example implementation in which power multiplexors 310 are disposed within memory channels between memory blocks.
Figure 3B:
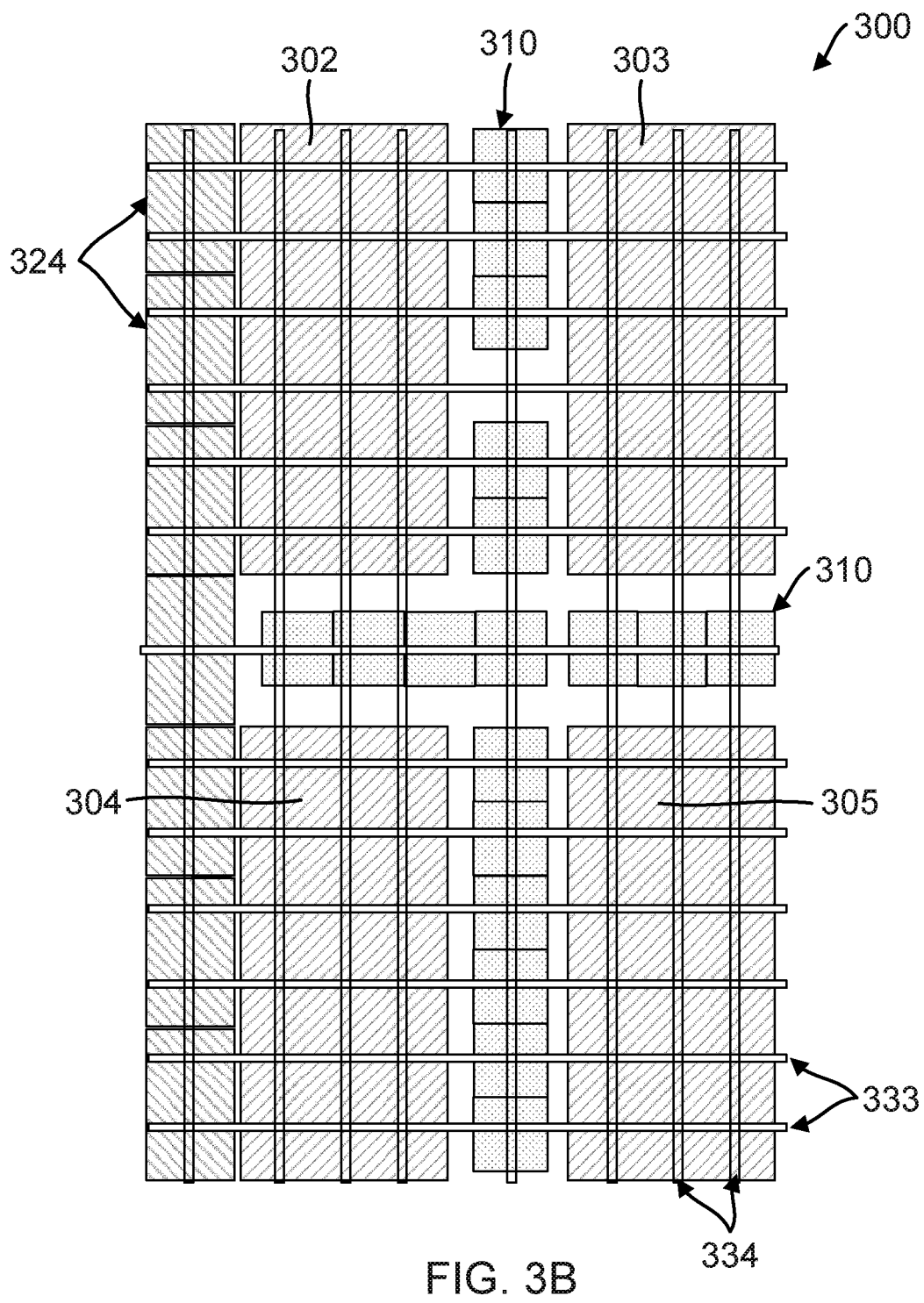
Figure 3C:
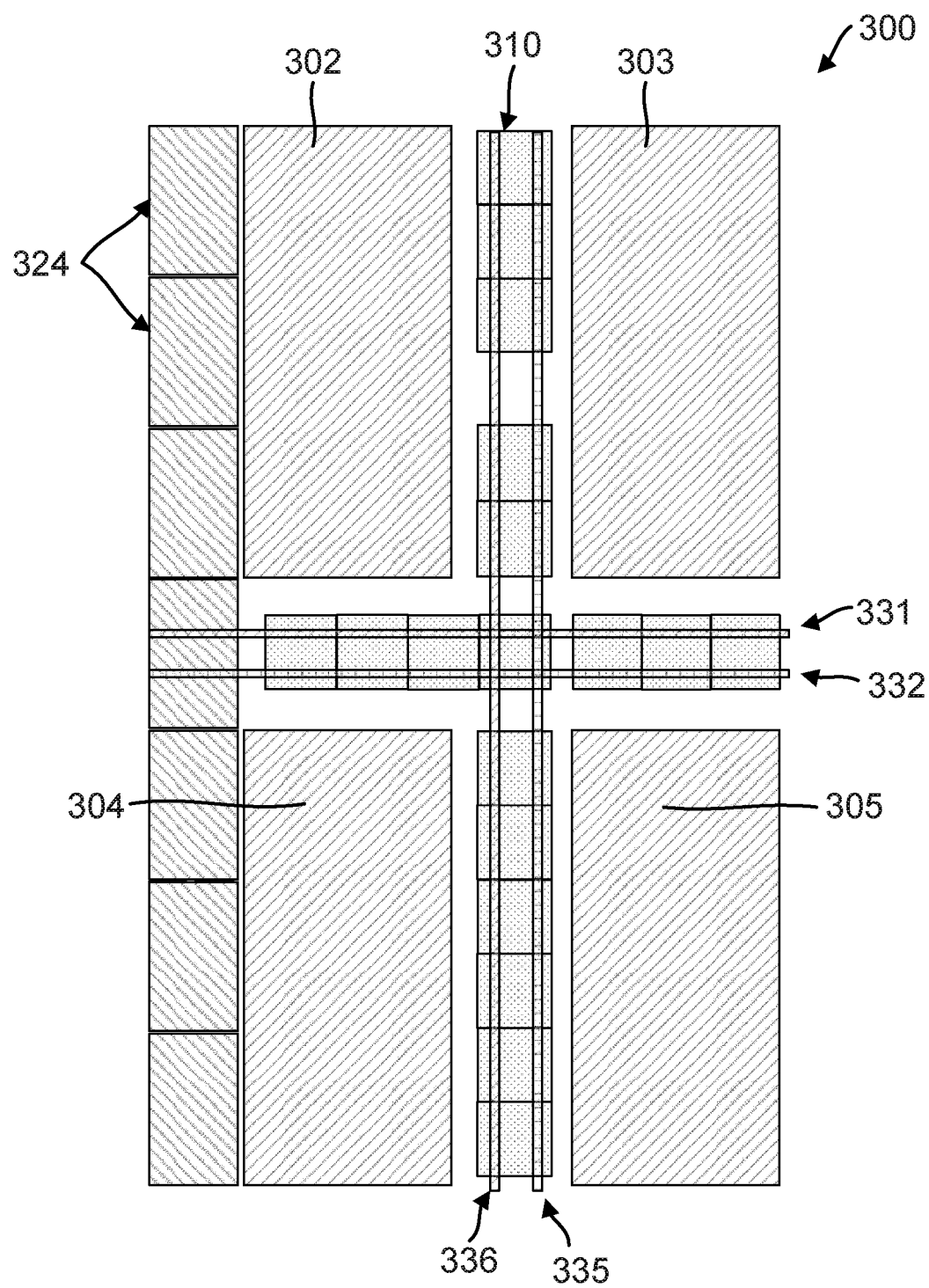

FIGS. 3A-C illustrate an example implementation in which power multiplexors 310 are disposed within memory channels between memory blocks 302-305. FIG. 3A illustrates the memory blocks 302-305, the power multiplexors 310, and the enable logic circuitry blocks 324 for ease of illustration. FIG. 3B shows the vertical tracks 333 and horizontal tracks 334, which supply the operating voltage Vdd_apm from the power multiplexors 310 to the memory blocks 302-305. FIG. 3C shows the vertical and horizontal tracks 335, 332 respectively that are in communication with a first power supply MX, and the vertical and horizontal tracks 336, 331 respectively that are in communication with a second power supply CX. Collectively, FIGS. 3A-C illustrate an implementation that includes all of the tracks 331-336 built into a semiconductor device.

FIGS. 3A-C provide a top-down illustration that is not to scale. Furthermore, FIGS. 3A-C do not show the different metal layers that would be expected to be used when implementing the architecture of FIGS. 3A-C within an SOC. Nevertheless, it is understood that while the tracks 331-336 are shown as intersecting, they are within different layers as appropriate so that different voltages are not shorted. Furthermore, the various tracks 331-336 may be electrically coupled to any of the memory blocks 302-305, multiplexors 310, or enable logic circuitry block 324 by vias as appropriate. The use of tracks and vias as shown in FIGS. 3A-C may be applied to the other implementations described herein to provide appropriate electrical coupling for power multiplexors, such as 110 and 310.

In this example, the enable logic circuitry blocks 324 are similar to the enable logic circuitry block 124 discussed above in more detail with respect to FIGS. 1 and 2. Each of the power multiplexors 310 are similar to the power multiplexors 110 discussed above in more detail with respect to FIGS. 1 and 2. The power multiplexors 310 are in communication with two different power supplies, MX and CX by tracks 331, 332, 335, and 336. While no tracks are shown to distribute a select signal from the enable logic circuitry blocks 324 to the power multiplexors 310, it is understood that tracks similar to any of tracks 331-336 may be included additionally as appropriate. Each of the multiplexors 310 selects one of the power supplies MX, CX as an operating voltage to provide to one or more of the memory blocks 302-305 by the tracks 333, 334.

Figure 4:
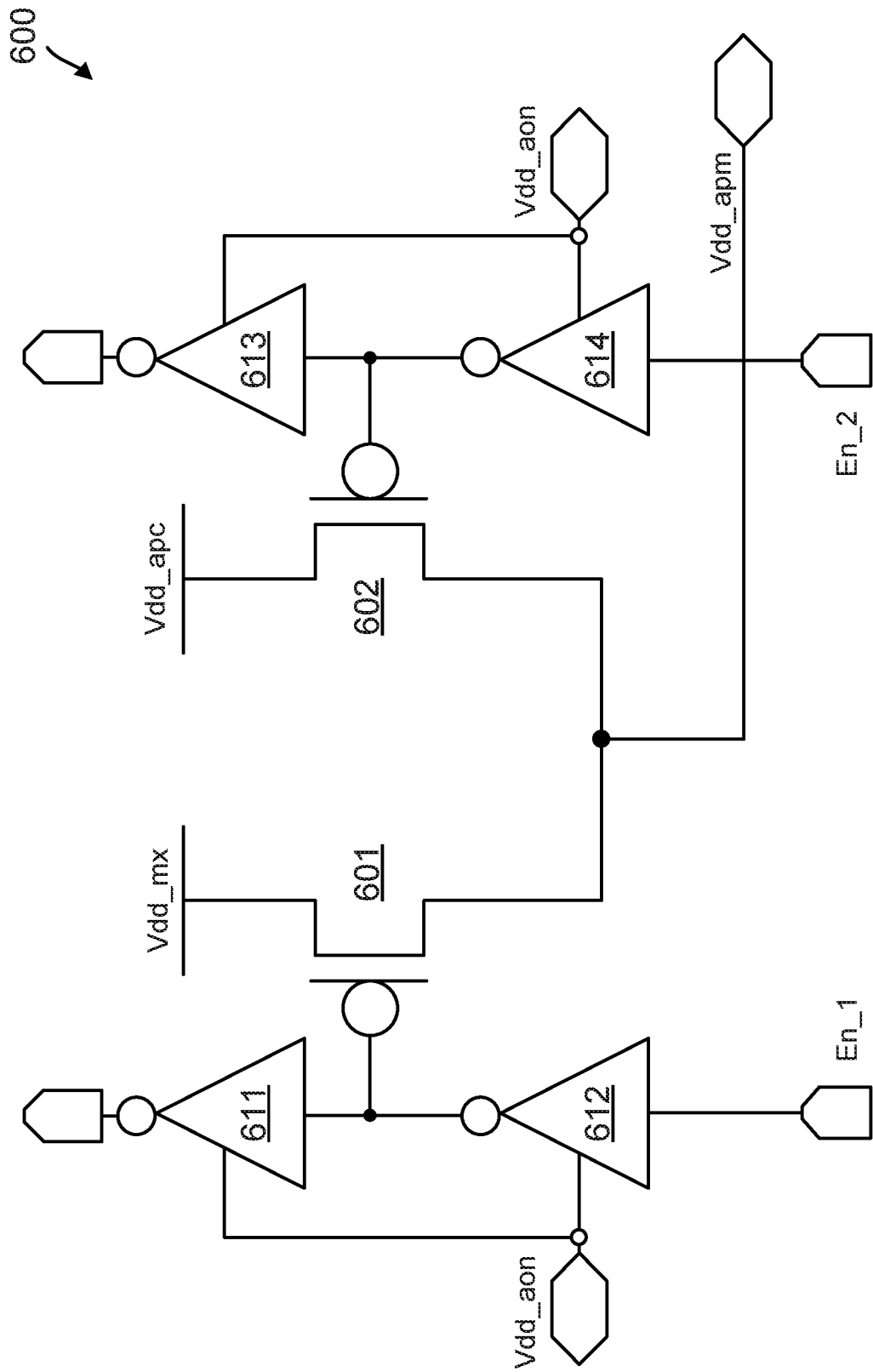
FIG. 4 is an illustration of an example power multiplexor, according to one implementation.

FIG. 4 is an illustration of an example power multiplexor 600, according to one implementation. For instance, the power multiplexors 110 and 310 may adopt the architecture shown in FIG. 4. However, any appropriate power multiplexor architecture may be used in various implementations.

The power multiplexor 600 selects between two power supplies, Vdd_MX and Vdd_apc. In one example, Vdd_MX represents a power supply that is used as a default for the memory blocks, and Vdd_apc represents a variable power supply that is used by the processor. Continuing with the example, during a turbo mode of operation, Vdd_apc may be increased and may be provided to memory blocks by the power multiplexor 600. During a non-turbo mode of operation, power multiplexor 600 may select the Vdd_MX power supply for the memory blocks.

The implementation of FIG. 4 includes two enable signals, En_1 and En_2 and two P-type metal oxide semiconductor (PMOS) transistors, 601 and 602. PMOS transistors 601, 602 are off when the gate-source voltage is larger than or equal to zero and are on when the gate-source voltage is negative. Therefore, when En_1 is high, and En_2 is low, transistor 601 is on and power multiplexor 600 selects Vdd_MX to output as Vdd_apm. On the other hand, when En_1 is low and En_2 is high, transistor 602 is on and power multiplexor 600 selects Vdd_apc.

Furthermore, the enable signals En_1 and En_2 are utilized so that only one is on at a given time, thereby preventing a scenario where Vdd_MX and Vdd_apc are shorted. Nevertheless, both En_1 and En_2 may be low, thereby selecting neither power supply.

When transistor 601 is on, and transistor 602 is off, the voltage VDD_aon is applied at the gate of transistor 602. Vdd_aon is a switching voltage, and it is selected to be the higher of Vdd_MX and Vdd_apc, thereby ensuring that the gate-source voltage is greater than or equal to zero, even if the voltage level of Vdd_apc changes. Similarly, when transistor 601 is turned off Vdd_aon is applied at its gate, thereby ensuring that the gate-source voltage is greater than or equal to zero during its off state.

Vdd_aon may be provided by one or more voltage generators that may be separate from, or included in, enable logic circuitry blocks (e.g., 124, 126, 324). Also, the enable signals represent a particular implementation of the select signal (SEL) of FIG. 2, and they may be supplied by enable logic circuitry blocks. Techniques to supply Vdd_aon and enable signals are explained in more detail below with respect to FIGS. 5-6.

An advantage of the implementation of FIG. 4 is that the power multiplexor 600 can be built to be relatively small, as it includes two transistors 601, 602 and four inverters 611-614. Therefore, in some applications, multiplexor 600 may be small enough to be physically disposed within the space between two memory blocks, otherwise referred to as a memory channel. Such an arrangement is shown in FIGS. 1 and 3, where some or all of the power multiplexors 110 and 310 are disposed in memory channels. The circuitry responsible to provide the enable signals and the switching voltage may be placed elsewhere so as not to use silicon area within the memory channels. For instance, the implementations of FIGS. 1 and 3 place such circuitry in the enable logic circuitry blocks 124, 126, 324 at the periphery of the SOC.

Figure 5:
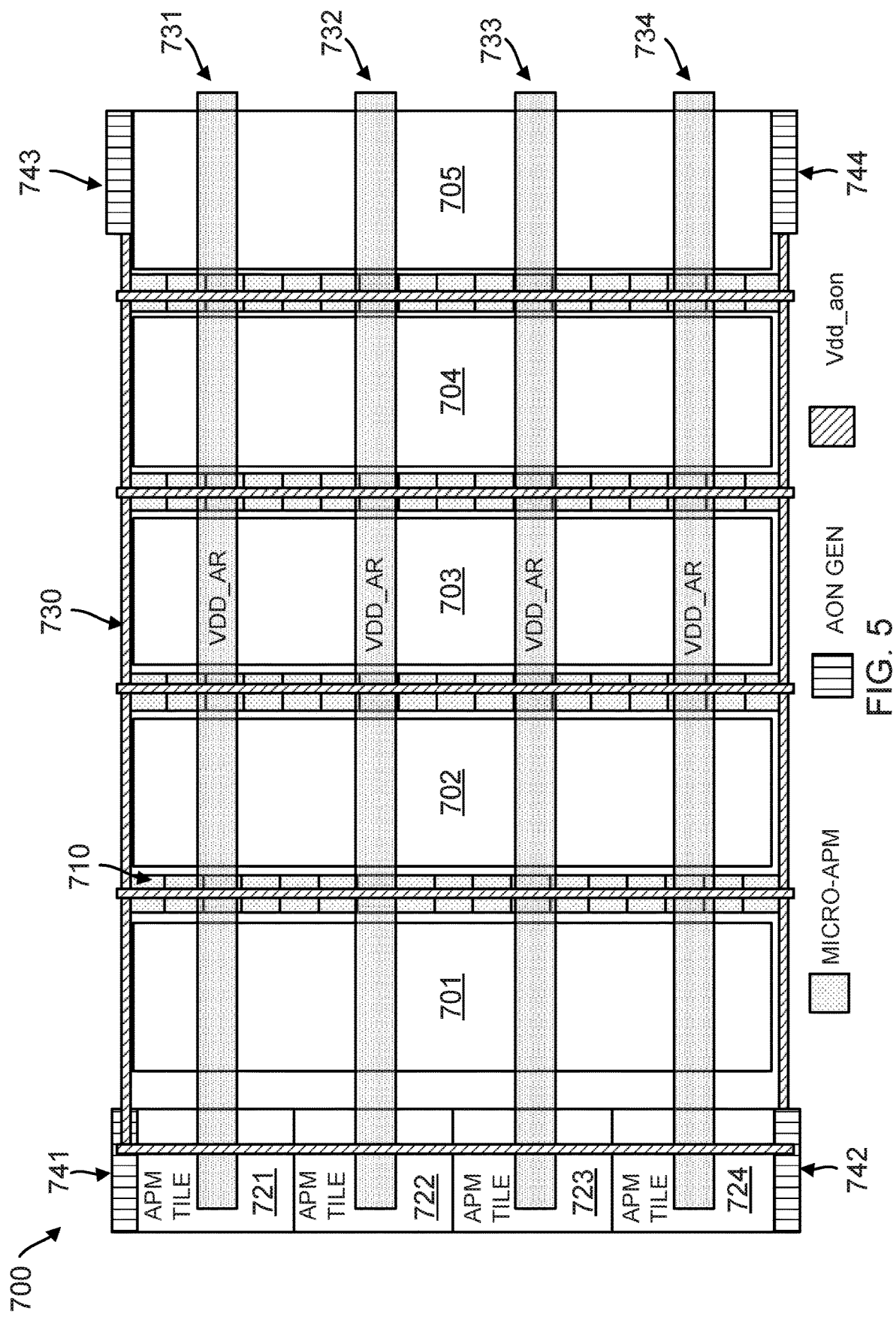
FIG. 5 is an illustration of an example system, which may be implemented in an SOC, according to one implementation.

FIG. 5 is an illustration of an example system 700, which may be implemented in an SOC, according to one implementation. FIG. 5 is provided to show techniques that may be used to distribute the switching voltage Vdd_aon in some applications, including those shown in FIGS. 1 and 3.

In the example of FIG. 5, the enable logic circuitry blocks 721-724 are placed at a periphery of the SOC, and the memory blocks 701-705 extend from right to left toward the center of the SOC. The enable logic circuitry blocks 721-724 may be similar in structure and operation to those discussed above with respect to FIGS. 1 and 3 and, specifically, those enable logic circuitry blocks 124, 126, 324. In this example, the enable logic circuitry blocks 721-724 may provide enable signals to the power multiplexors 710 under control of a power management program, e.g., in an operating system kernel. The enable logic circuitry blocks 721-724 are referred to as "APM tiles" in FIG. 5 to indicate the role they play in adaptive power multiplexing (APM) operations. The power multiplexors 710 are referred to as "MICRO-APM" in FIG. 5 to indicate their physical size is limited by omitting enable logic circuitry and switching voltage generation from the power multiplexors 710 themselves.

Figure 7:
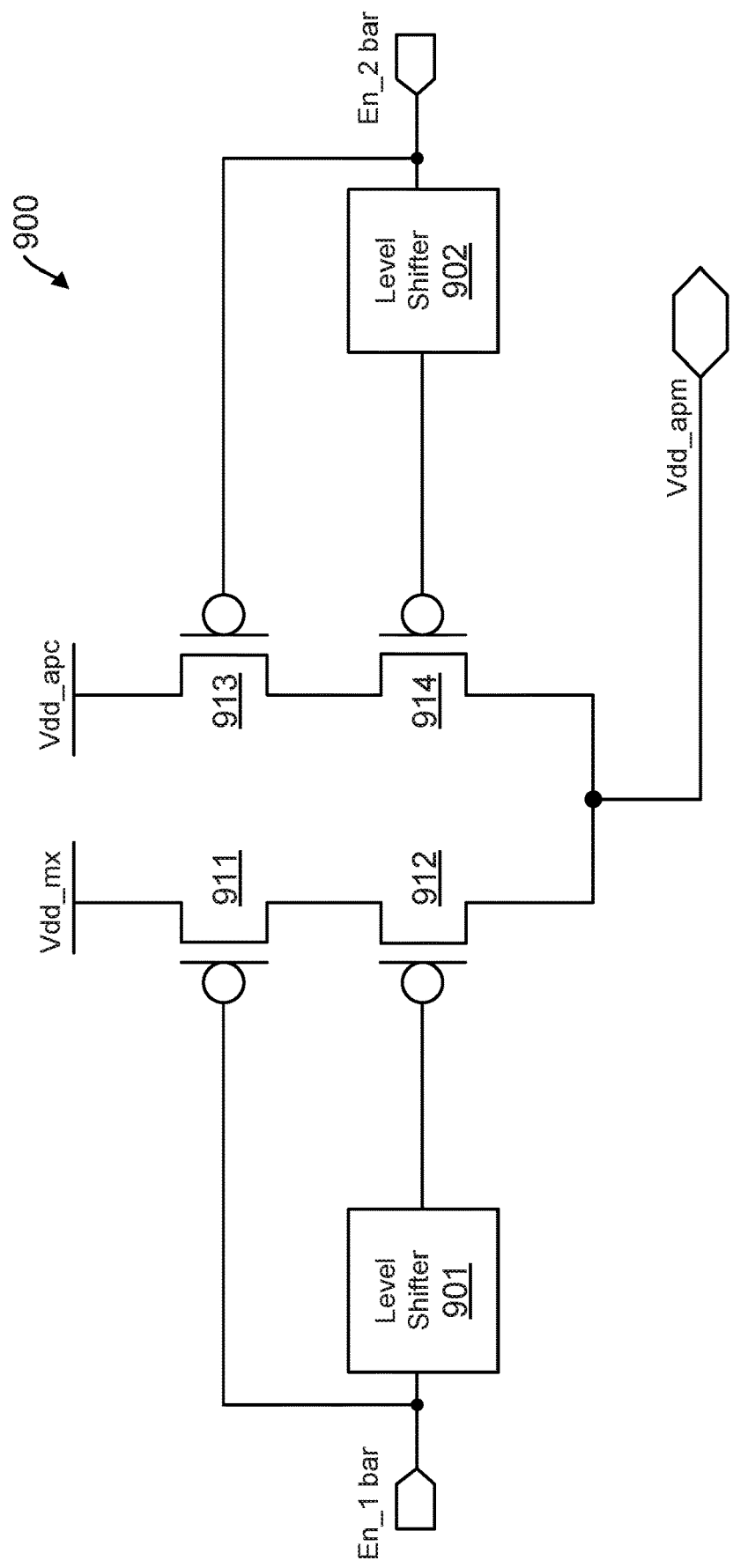
FIG. 7 is an illustration of an example power multiplexor, according to one implementation.

Only one power multiplexor 710 is labeled for ease of illustration but is understood that the other power multiplexors in the implementations of FIG. 7 are substantially the same as the one illustrated as item 710. The power multiplexors 710 are disposed within areas between each of the memory blocks 701-705, also called memory channels. The power multiplexors 710 output Vdd_apm onto power rails 731-734, labeled VDD_AR. The power rails 731-734 are electrically coupled with the memory blocks 701-705 as well as respective ones of the enable logic circuitry blocks 721-724. There are fewer power rails 731-734 than there are power multiplexors 710 within a given memory channel, so more than one power multiplexor 710 may share a respective power rail 731-734.

The power multiplexor specifically designated as item 710 may provide power to either or both of memory blocks 701 and 702, which are both adjacent to the power multiplexor specifically labeled as item 710. Therefore, the power multiplexor specifically labeled as item 710 provides power to adjacent memory blocks 701, 702 and avoids intervening voltage drops that would otherwise be caused by other memory blocks in different applications. The same is true for the other power multiplexors 710 between blocks 701, 702 and between the other blocks 703-705; that is, each of the power multiplexors 710 provides power to adjacent memory blocks by at least one of the power rails 731-734. An advantage of the implementation of FIG. 7 is that voltage drops from multiplexor to memory block are reduced or eliminated by omitting intervening voltage drops that would otherwise be caused by intervening memory blocks.

The power multiplexors 710 receive switching voltage Vdd_aon from the voltage generators 741-744 by way of the track 730. The voltage generators 741-744 of the implementation of FIG. 7 do not occupy silicon area within the memory channels between each of the memory blocks 701-705. Rather, the voltage generators 741-744 are placed either with the enable logic circuitry blocks 721-724 or adjacent memory block 705.

In some implementations, the voltage generators 743, 744 may be omitted. However, implementations that include more voltage generators distributed within the SOC may benefit from a more uniform level of Vdd_aon throughout the SOC at the cost of more circuit overhead due to the additional voltage generators. In any event, the scope of implementations is not limited to any number or placement of voltage generators, as any appropriate number and placement of voltage generators may be used.

Figure 6:
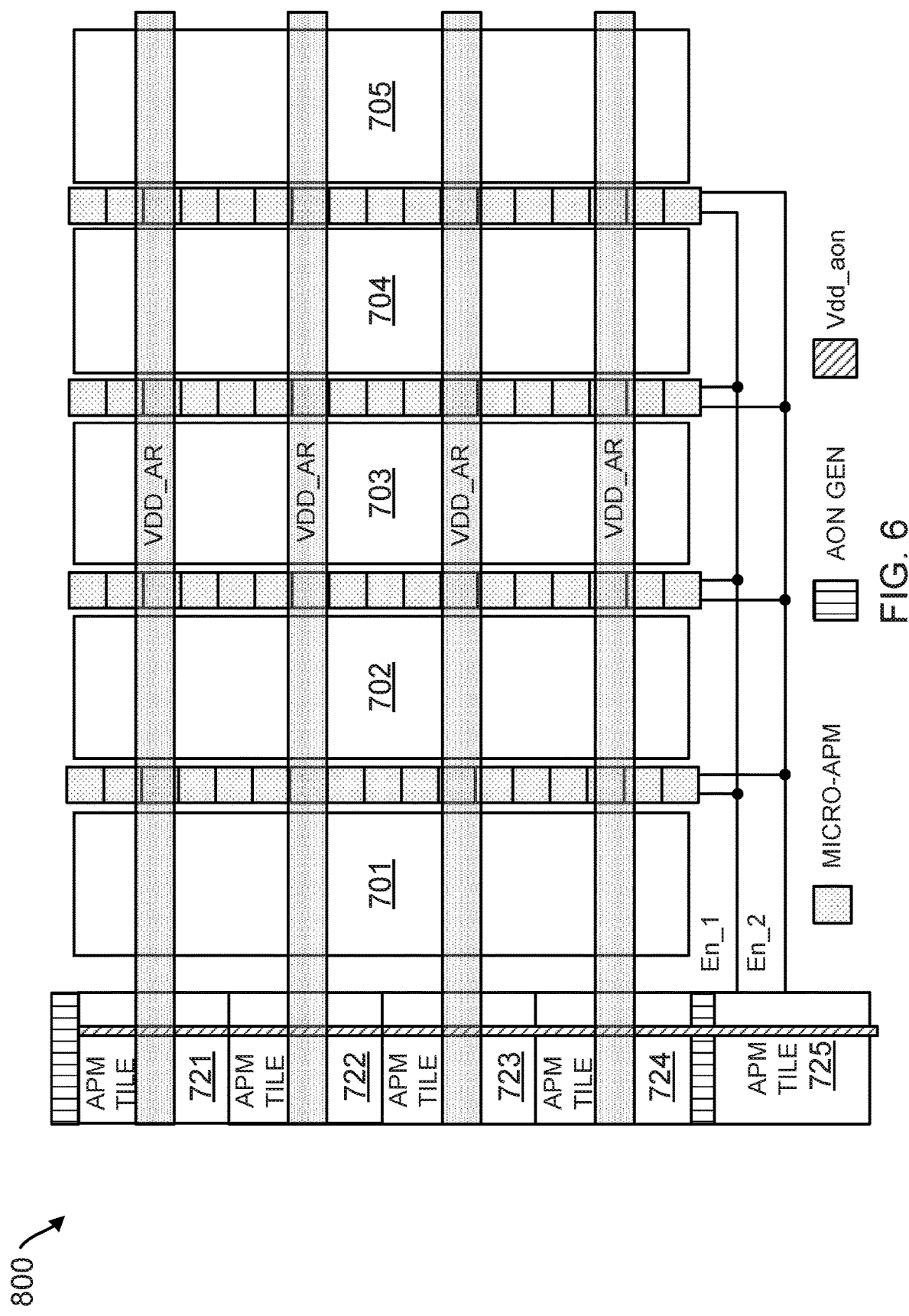
FIG. 6 is an illustration of an example system, which may be implemented in an SOC, according to one implementation.

FIG. 6 is an illustration of an example system 800, which may be implemented in an SOC, according to one implementation. FIG. 6 is provided to show techniques that may be used to distribute the enable signals and the switching voltage Vdd_aon in some applications, including those shown in FIGS. 1 and 3.

The implementation of FIG. 6 operates similarly to the implementation of FIG. 5. Specifically, each of the power multiplexors 710 provides an operating voltage to an adjacent one or two of the memory blocks 701-705 by way of power rails 731-734. In some implementations, the enable logic circuitry blocks 724-725 may include multiplexors themselves (in addition to the power multiplexor 710), and those multiplexors within the enable logic circuitry blocks 724-725 may utilize the switching voltage Vdd_aon by way of track 730. However, the switching voltage Vdd_aon is not distributed to the power multiplexors 710 in the memory channels. Rather, each of the power multiplexors 710 in the memory channels may be built according to an architecture that ensures transistors turn off in a different way. An example is shown in FIG. 7.

FIG. 7 is an illustration of an example power multiplexor 900, according to one implementation. The example power multiplexor 900 may be used in any of the implementations described above. Power multiplexor 900 is described in U.S. Pat. No. 10,103,626, which is incorporated herein by reference in its entirety.

Power multiplexor 900 includes four PMOS transistors 911-914 and level shifters 901, 902. Instead of receiving En_1 and En_2, power multiplexor 900 receives the inverse (also referred to as bar) of those enable signals. Each of the level shifters 901, 902 selects the higher of the two power supplies Vdd_MX and Vdd_apc when receiving a high signal. When En_1 is high, its inverse is low (a digital zero), which is applied to the gates of transistors 911 and 912, thereby turning those transistors on and selecting Vdd_MX. When En_1 is high, it is expected that En_2 would be low, so that the inverse of En_2 would be high (a digital one). The digital one turns transistors 913 and 914 off. In the case of transistor 914, it receives the higher of Vdd_MX and Vdd_apc from the level shifter 902. The higher voltage at transistor 914 ensures that transistor 914 is turned off, thereby preventing any current from Vdd_apc.

Vice versa is true as well. When transistors 911, 912 are off, transistors 913 and 914 are on. In such an instance, transistor 912 receives the higher of Vdd_MX and Vdd_apc, thereby ensuring that transistor 912 is off thereby preventing any current from Vdd_MX.

An advantage of the implementation of FIG. 7 is that the architecture of the SOC may omit distributing Vdd_aon to the power multiplexors 710 in the memory channels. However, the two additional transistors of power multiplexor 910 may incur an extra voltage drop from each of the power supplies Vdd_MX, Vdd_apc during use. Furthermore, the power multiplexor 900 of FIG. 7 is larger than the power multiplexor 600 of FIG. 6 and may be unable to be implemented within memory channels in some applications where space within the memory channels is at a premium.

Returning to FIG. 6, it also shows an example of routing the enable signals En_1 and En_2. Specifically, the enable logic circuitry block 725 distributes the enable signals to the power multiplexors 710 within the channels between the memory blocks 701-705. And while FIG. 6 shows enable distribution wires only from enable logic circuitry block 725, that is for ease of illustration. It is understood that the other enable logic circuitry blocks 721-725 may distribute enable signals to ones of the power multiplexors 710 using enable distribution wires (not shown) or not. The technique to route enable signals shown in FIG. 6 may be applied to the other implementations described above in FIGS. 1-3 and 5.

Figure 8:
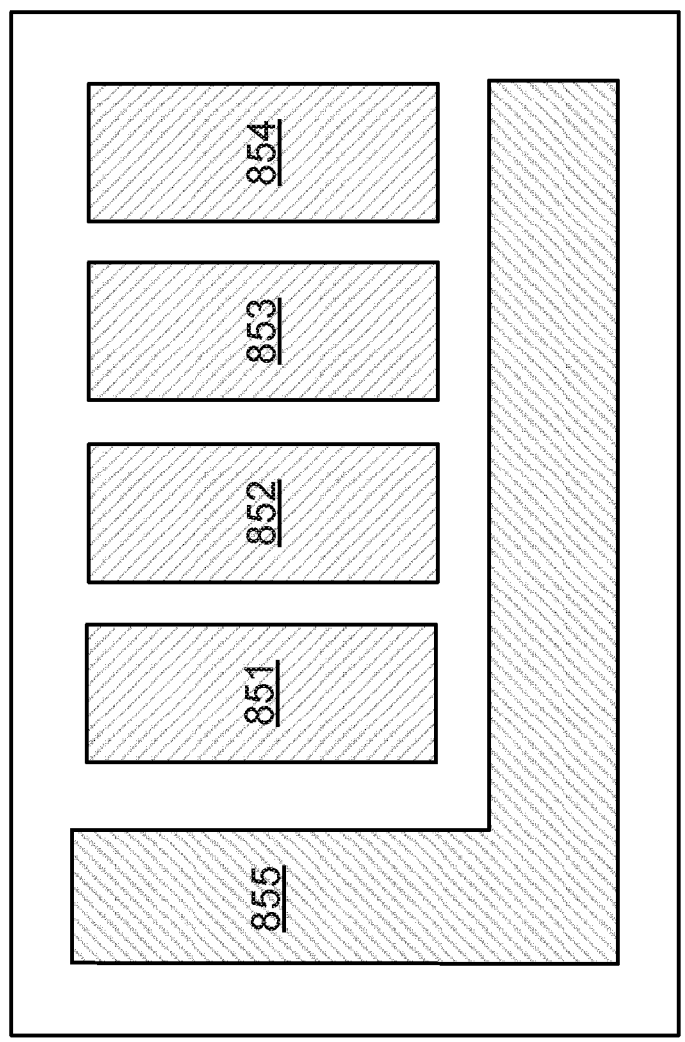
FIG. 8 shows an example enable logic circuitry block that includes either three or four switch blocks, according to one implementation.

Furthermore, the enable logic circuitry blocks 721-725 may be used for any appropriate purpose. For instance, in the implementation of FIG. 6, the blocks 721-725 host the voltage generators 741, 742. Additionally, each of the enable logic circuitry blocks 721-725 may include power multiplexors that are in addition to the power multiplexors 710 within the memory channels. Such additional power multiplexors are not shown in FIG. 6, but they may be used in addition to, or instead of, power multiplexors 710 to provide operating voltage to any one of the memory blocks 701-705. In fact, each of the enable logic circuitry blocks 721-725 may include one or more power multiplexors, where more power multiplexors within a given enable logic circuitry block would be expected to decrease a voltage drop because they can be routed in parallel to multiple memory blocks at a time. However, such a technique may use additional routing and metal layers than those shown in FIG. 6. FIG. 8 shows an example enable logic circuitry block 850 that includes four switch blocks 851-854, according to one implementation, though the scope of implementations may include any number of switch blocks. Block 850 also includes enable logic circuitry and switching voltage generation circuitry 855.

When compared to FIG. 2, block 850 may include enable logic circuitry block as well as switching voltage generation, and each of the switch blocks 851-854 may correspond to one power multiplexor 110. Thus, the scope of implementations does not exclude that at least some of multiplexing function may be implemented within an enable logic circuitry block. The enable logic circuitry and switching voltage generation of block 855 may communicate with one or more smaller power multiplexors, such as those shown as 110 or 310 in the examples above. In other words, block 850 may be implemented as one or more of the blocks 124, 126, 324, and/or 721-725 in some implementations.

Figure 9:
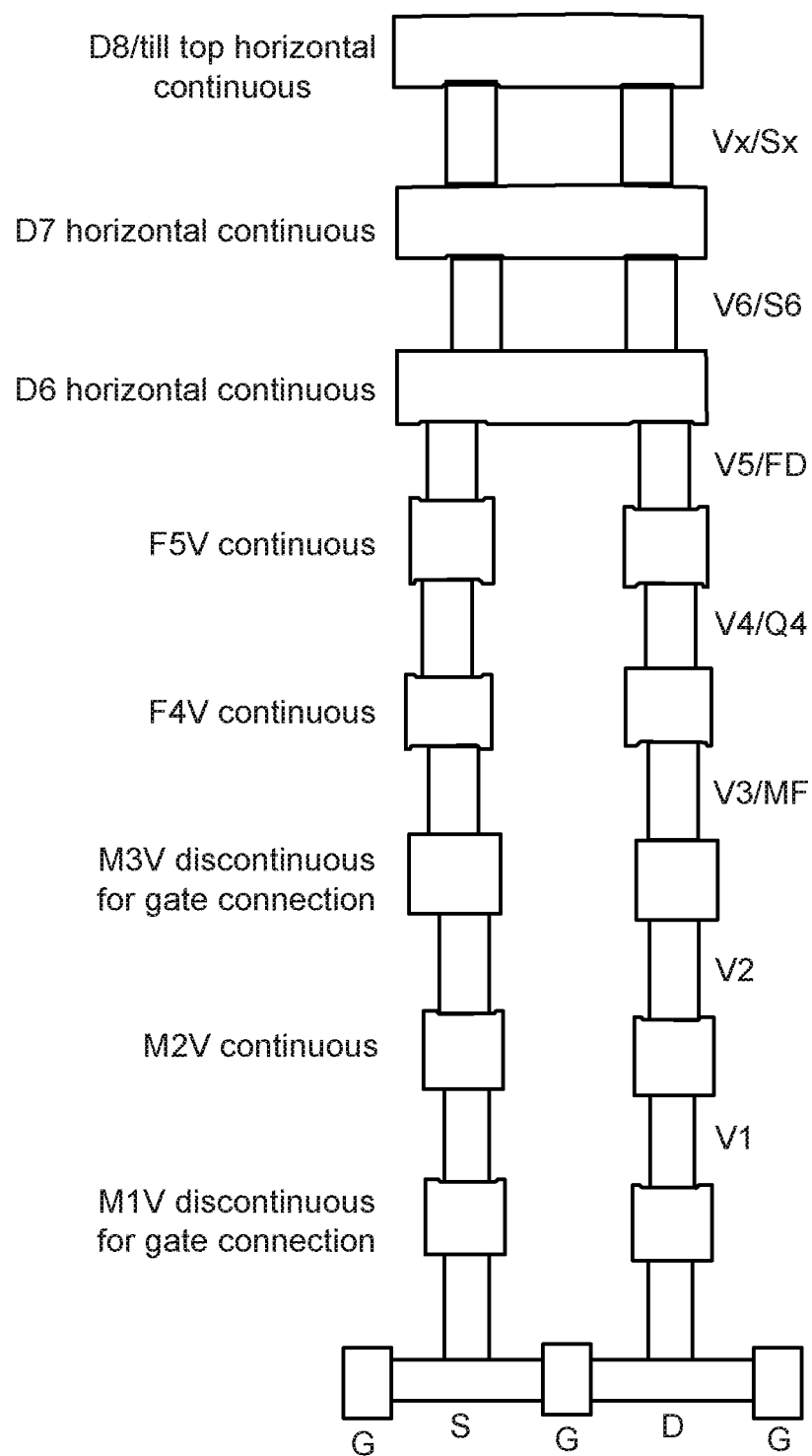
FIG. 9 shows additional routing and metal layers that may be used with the implementation of FIG. 8.

FIG. 9 shows additional routing and metal layers that may be used with the implementation of FIG. 8. The metal layers are shown (from top to bottom) D8-M1, with transistors shown below M1. The different metal layers are connected by vias, denoted by "V". The switch blocks 851-854 of FIG. 8 may be implemented in any appropriate way using the metal layers and vias of FIG. 9. In one implementation, the design maximizes a number of vias allowed by applicable constraints, thereby increasing the number of wiring paths for a given volume within the device, where the increased number of wiring paths serve an increased number of switch blocks 851-854.

The implementations described above with respect to the FIGS. 1-9 may offer advantages over other designs that dispose power multiplexors only within a periphery of an SOC. For instance, when power multiplexors are restricted to a periphery of an SOC, they may deliver operating voltage to multiple memory blocks in series over a voltage rail. However, each of those memory blocks may result in a voltage drop that increases quadratically with more intervening memory blocks so that the memory block furthest from the power multiplexor may experience a noticeable voltage drop. Some systems may then raise a minimum voltage of the power rail so that the furthest memory blocks receive an acceptable operating voltage level. However, raising the minimum voltage level on the rail may waste power. Alternatively, such systems may not raise the minimum voltage level on the rail, but in such a scenario the memory blocks may be limited to an operating speed corresponding to the lowest voltage level at the furthest memory block.

By contrast, various implementations described herein may place power multiplexors proximate their memory blocks so that a given power multiplexor is adjacent to the one or two memory blocks that it serves. Thus, at least some of the power multiplexors and their respective memory blocks may be arranged spatially so that a given multiplexor supplies a given memory block without any intervening memory blocks that would cause a voltage drop. As a result, the design may omit voltage compensation on the rail that would otherwise be employed in the case of intervening voltage drops. Also, each of the memory blocks may be run at a speed that is not reduced due to a lower voltage at another memory block.

A flow diagram of an example method 1000 of multiplexing between multiple power supplies is illustrated in FIG. 10. In one example, method 1000 is performed by the circuits shown in FIGS. 1-7. The circuits may operate under control of a power management unit, which may include hardware and/or software functionality at a processor (e.g., CPU) of a computing device included within the processing blocks 106 in the SOC 100 of FIG. 1. In some examples, a power management unit includes processing circuitry that executes computer readable instructions to select one power supply or another power supply as an operating voltage for one or more memory blocks.

At action 1010, the system selects a first power supply as an operating voltage for a first memory block. For instance, the first power supply may be at a higher voltage level to support a turbo processing mode. In another example, the first power supply may be at a lower voltage level for use during non-turbo operation to save battery life as compared to a higher voltage level.

In this example, the first power supply is selected by a first power multiplexor that is disposed between the first memory block and a second memory block. An example is shown at FIG. 1, where power multiplexors 110 are disposed between memory blocks 102, 103. Other examples are shown in FIGS. 3A-C, 5, 6. Gate-level and transistor-level examples of power multiplexors for use in this implementation are shown at FIGS. 2, 4, and 7.

Additionally, the selecting may be performed under control of enable logic circuitry disposed at a periphery of a chip, such as a chip. Examples of enable logic circuitry include enable logic circuitry 124 of FIGS. 1-2, enable logic circuitry 324 of FIGS. 3A-C, and enable logic circuitry 721-725 of FIGS. 5-6. Further in this example, the enable logic circuitry may also provide a switching voltage configured to turn transistors of the multiplexor on or off. An example is Vdd_aon in the above-described implementations.

Continuing with the example, the selecting may be performed by either asserting or de-asserting an enable signal to transistors of the first power multiplexor. In one example, the multiplexor includes PMOS transistors, which are turned off by a high (digital one) signal and turned on by a low (digital zero) signal. Thus, in a PMOS implementation, a low signal may be used to turn on a transistor, thereby creating a current path between the first power supply and a power rail feeding the first memory block, while a high signal turns off another transistor that would otherwise create a current path between the second power supply and the power rail. In an example using N-type metal oxide semiconductor (NMOS) transistors, a high signal is used to turn the transistors on, and a low signal is used to turn the transistors off. The enable signal may be provided by the enable logic circuitry.

At action 1020, the system selects a second power supply as an operating voltage for the first memory block under control of the enable logic circuitry. For instance, the system may go from a turbo mode to a non-turbo mode (or vice versa) in switching from the first power supply to the second power supply. Just as in selecting the first power supply, selecting the second power supply may include asserting or de-asserting an enable signal to turn on or off appropriate transistors in the first power multiplexor.

The scope of implementations is not limited to the actions shown in FIG. 10 rather, other implementations may add, omit, rearrange, or modify one or more the actions. For instance, some implementations may include repeating actions 1010-1020 multiple times during normal operation as a processor on a chip goes from one power mode to another power mode.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

What is claimed is:

1. A system on chip (SOC) comprising:
a first memory block and a second memory block;
a processing unit coupled to the first memory block and the second memory block;
a first power multiplexor disposed between the first memory block and the second memory block, and coupled to a first power rail configured to provide an operating voltage to both the first memory block and the second memory block;
enable logic circuitry disposed at a periphery of the SOC away from the first memory block and the second memory block, the enable logic circuitry being configured to control the first power multiplexer to select between a first power supply voltage and a second power supply voltage to provide the operating voltage to the first power rail; and
a voltage generator configured to provide a switching voltage to the first power multiplexor by a second power rail, wherein the first power multiplexor is configured to use the switching voltage to switch off transistors within the first power multiplexor.

2. The SOC of claim 1, further comprising a second power multiplexor disposed between the first memory block and the processing unit and coupled to the first power rail.

3. The SOC of claim 1, wherein the first power multiplexor is one of a plurality of power multiplexors disposed in a memory channel between the first memory block and the second memory block, the plurality of power multiplexors being coupled to the enable logic circuitry.

4. The SOC of claim 1, wherein the voltage generator comprises one of a plurality of voltage generators coupled to the second power rail.

5. The SOC of claim 1, wherein the voltage generator is disposed in the periphery of the SOC.

6. The SOC of claim 1, wherein the voltage generator is disposed away from the periphery the SOC and adjacent to the first memory block.

7. A method comprising:
selecting a first power supply as an operating voltage for a first memory block, wherein the first power supply is selected by a plurality of first power multiplexors and by a plurality of second power multiplexors disposed between the first memory block and a second memory block, wherein the selecting is under control of an enable logic circuitry disposed at a periphery of a system on chip (SOC) away from the first memory block and the second memory block;
selecting a second power supply as an operating voltage for the first memory block under control of the enable logic circuitry; and
receiving a switching voltage at a control terminal of a transistor in each power multiplexer in the plurality of first power multiplexors and the plurality of second power multiplexors, the switching voltage turning the transistor off, wherein the switching voltage is selected to be a higher voltage level of: the first power supply and the second power supply.

8. The method of claim 7, wherein selecting the first power supply comprises receiving an enable signal from the enable logic circuitry for each power multiplexor in the first plurality of power multiplexors and in the second plurality of power multiplexors.

9. The method of claim 7, further comprising controlling the enable logic circuitry by a power control program running on a processing unit of the SOC.

10. A semiconductor chip comprising:
a first memory block and a second memory block;
a first power multiplexor disposed between the first memory block and the second memory block, and coupled to a first power rail configured to provide an operating voltage to both the first memory block and the second memory block;
means for controlling the first power multiplexor to select between a first power supply voltage and a second power supply voltage to provide the operating voltage to the first memory block and the second memory block, wherein the means for controlling is disposed at a periphery of the chip away from the first memory block and the second memory block, the controlling means being coupled to control terminals of transistors of the first power multiplexor; and
a voltage generator configured to provide a switching voltage to the first power multiplexor by a second power rail, wherein the first power multiplexor is configured to use the switching voltage to switch off the transistors within the first power multiplexor.

11. The semiconductor chip of claim 10, wherein the first power multiplexor is configured to provide the operating voltage to the first memory block and without a voltage drop attributable to an intervening memory block.

12. The semiconductor chip of claim 10, wherein the first power multiplexor comprises a plurality of power multiplexors disposed within a memory channel between the first memory block and the second memory block.

13. The semiconductor chip of claim 10, wherein the first power multiplexor comprises a first plurality of power multiplexors disposed within a memory channel between the first memory block and the second memory block and a second plurality of power multiplexors disposed between the second memory block and a processing unit.

14. A system on chip (SOC) comprising:
a first memory block and a second memory block;
processing logic comprising a grouping of processing blocks, the processing logic being disposed so that the first memory block and the second memory block are between the processing logic and a periphery of the SOC, the periphery of the SOC corresponding to a lateral portion of a side of the SOC;
enable logic circuitry disposed within the periphery of the SOC;
a first plurality of power multiplexors disposed between the first memory block and the second memory block, the first plurality of power multiplexors configured to receive enable signals and a switching voltage from the enable logic circuitry; and
a second plurality of power multiplexors disposed between the second memory block and the processing logic, the second plurality of power multiplexors configured to receive the enable signals and the switching voltage from the enable logic circuitry.

15. The SOC of claim 14, further comprising: a voltage generator configured to provide the switching voltage to the first plurality of power multiplexors by a first power rail.

16. The SOC of claim 15, wherein the voltage generator is disposed in the periphery of the SOC.

* * * * *